(12) United States Patent
Norwich

(10) Patent No.: US 11,927,256 B2
(45) Date of Patent: Mar. 12, 2024

(54) TORQUE CONVERTER

(71) Applicant: Schaeffler Technologies AG & Co. KG, Herzogenaurach (DE)

(72) Inventor: Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/883,688

(22) Filed: Aug. 9, 2022

(65) Prior Publication Data

US 2024/0052917 A1 Feb. 15, 2024

(51) Int. Cl.
*F16H 45/02* (2006.01)

(52) U.S. Cl.
CPC .................................. *F16H 45/02* (2013.01)

(58) Field of Classification Search
CPC ...................................................... F16H 45/02
See application file for complete search history.

(56) References Cited

U.S. PATENT DOCUMENTS

| | | | | |
|---|---|---|---|---|
| 4,765,200 A | * | 8/1988 | Koshimo | F16H 47/065 74/731.1 |
| 6,035,989 A | * | 3/2000 | Matsuoka | F16H 45/02 192/85.25 |
| 7,044,279 B2 | * | 5/2006 | Leber | F16H 45/02 192/3.25 |
| 9,810,302 B2 | * | 11/2017 | Sayre | F16H 45/02 |
| 9,915,328 B2 | * | 3/2018 | Moore | F16H 41/24 |
| 10,941,844 B2 | | 3/2021 | Nelson et al. | |
| 2011/0114433 A1 | * | 5/2011 | Hattori | F16H 45/02 192/3.29 |
| 2015/0300473 A1 | * | 10/2015 | Smith | F16H 41/24 60/330 |
| 2018/0106350 A1 | * | 4/2018 | Hilty | F16H 41/28 |

* cited by examiner

*Primary Examiner* — Dustin T Nguyen

(57) ABSTRACT

A torque converter includes a drive plate arranged to receive a torque. The torque converter further includes a front cover non-rotatably connected to the drive plate. The torque converter further includes a lock-up clutch including a piston and a clutch plate disposed between the piston and the front cover. The piston is axially slidable to engage the clutch plate. The torque converter further includes first and second seals each configured to seal the piston to the front cover. The first seal is arranged at an inner diameter of the piston, and the second seal is arranged radially outside of the first seal.

18 Claims, 1 Drawing Sheet

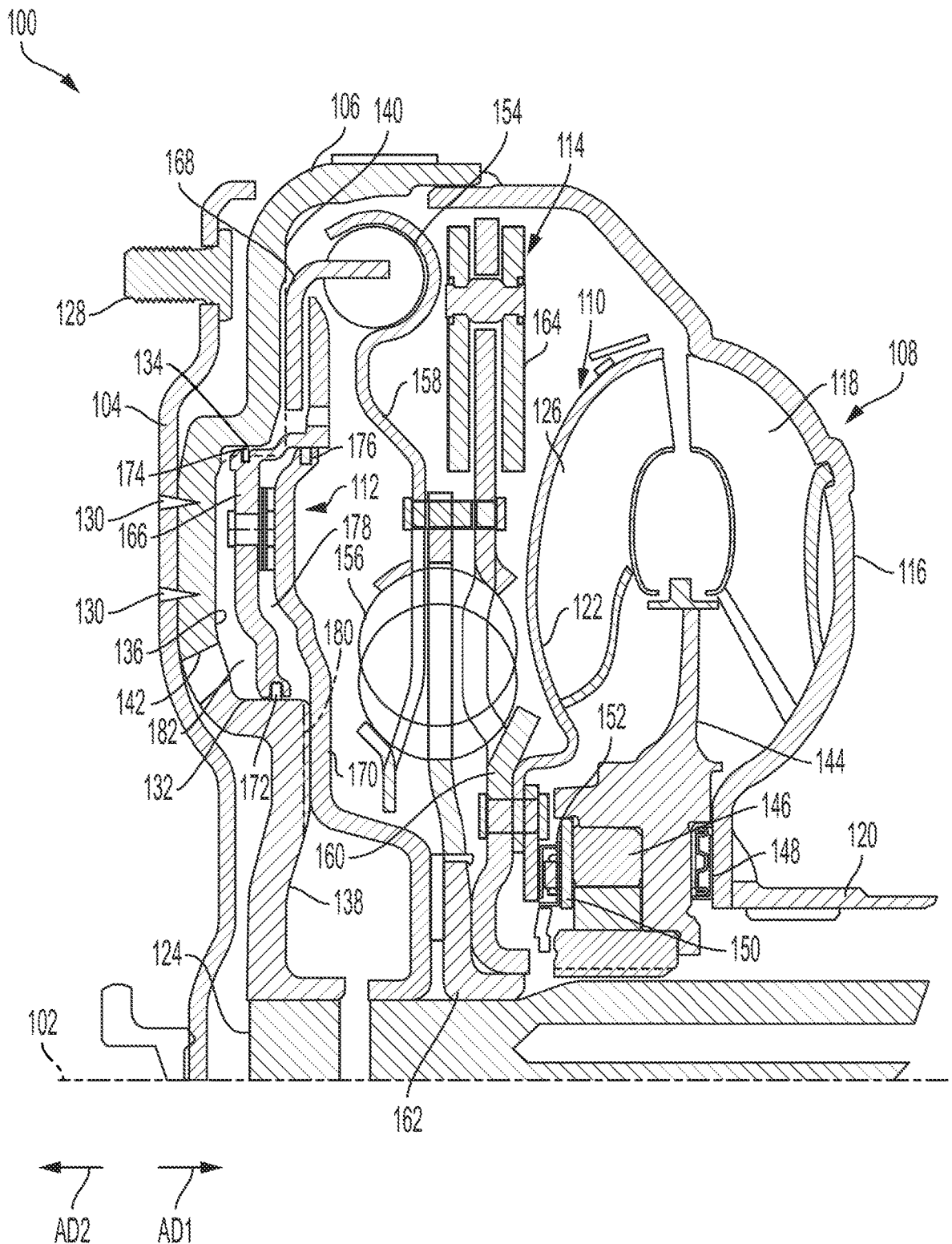

TORQUE CONVERTER

TECHNICAL FIELD

The present disclosure relates generally to a torque converter, and more specifically to a piston sealed to a front cover of the torque converter.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. Due to limited spacing within a torque converter envelope, it is desirable to have alternative designs and configurations to fit all the necessary components within the torque converter including the damper assembly.

SUMMARY

Embodiments disclosed herein provide a torque converter including a drive plate, a front cover, and a lock-up clutch. The drive plate is arranged to receive torque. The front cover is non-rotatably connected to the drive plate. The lock-up clutch includes a piston and a clutch plate disposed between the piston and the front cover. The piston is axially slidable to engage the clutch plate. The torque converter further includes first and second seals each configured to seal the piston to the front cover. The first seal arranged at an inner diameter of the piston, and the second seal arranged radially outside of the first seal.

In embodiments, the piston and the front cover may, at least partially, define a compensation chamber therebetween. The front cover may include an opening extending through the front cover into the compensation chamber. The compensation chamber may be in fluid communication with a transmission input shaft via the opening. The front cover may be non-rotatably connected to the drive plate radially outside of the opening.

In embodiments, the torque converter may include a projection configured to receive the torque and supported by the drive plate. The projection may be arranged radially outside of the second seal. The front cover may be non-rotatably connected to the drive plate radially inside of the projection.

In embodiments, the torque converter may include a seal plate non-rotatably connected to the front cover radially inside of the piston and sealed to the piston at an outer diameter of the seal plate. The torque converter may include grooves between the front cover and the seal plate. The seal plate and the piston may, at least partially, define an apply chamber therebetween. The grooves may extend radially into the apply chamber.

In embodiments, the piston and the seal plate may, at least partially, define an apply chamber therebetween. The piston and the front cover may, at least partially, define a compensation chamber therebetween. The first and second seals may be configured to maintain fluid separation between the apply chamber and the compensation chamber.

Embodiments of this disclosure further provide a torque converter including a drive plate, a front cover, and a lock-up clutch. The drive plate is arranged to receive a torque. The front cover is non-rotatably connected to the drive plate. The front cover includes an inner axial portion and an outer axial portion arranged radially outside of the outer axial portion. The lock-up clutch includes a piston. The piston is sealed to the inner axial portion and to the outer axial portion of the front cover.

In embodiments, the piston and the front cover may, at least partially, define a compensation chamber therebetween. The front cover may include an opening extending through the front cover into the compensation chamber. The compensation chamber may be in fluid communication with a transmission input shaft via the opening. The front cover may be non-rotatably connected to the drive plate radially outside of the opening. In embodiments, the front cover may include a radial portion extending from the inner axial portion to the outer axial portion. The opening may extend through the radial portion. The opening may be arranged closer to the inner axial portion than to the outer axial portion.

In embodiments, the torque converter may include a projection configured to receive the torque and supported by the drive plate. The projection may be arranged radially outside of the second seal. The front cover may be non-rotatably connected to the drive plate radially inside of the projection.

In embodiments, the torque converter may include a seal plate non-rotatably connected to the front cover radially inside of the piston and sealed to the piston at an outer diameter of the seal plate. The torque converter may include grooves between the front cover and the seal plate. The seal plate and the piston may, at least partially, define an apply chamber therebetween. The grooves may extend radially into the apply chamber.

In embodiments, the front cover may be non-rotatably connected to the drive plate radially between the inner and outer axial portions.

Instead of sealing a piston to a cover seal plate and an outer seal plate, embodiments described herein include the piston sealed to the cover and a drive plate non-rotatably connected to the cover to reduce a torque converter envelope, which allows for packaging of a damper assembly in smaller envelopes. Additionally, sealing the piston to the cover allows for circumferentially positioning the piston within reduced tolerances as compared to sealing the piston to multiple components separately connected to the cover.

BRIEF DESCRIPTION OF THE DRAWINGS

The single FIGURE illustrates a cross-sectional view of a portion of a torque converter according to the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Referring to the single FIGURE, a portion of a torque converter 100 is illustrated according to one embodiment of the present disclosure. At least some portions of the torque converter 100 are rotatable about a central axis 102. While only a portion of the torque converter 100 above the central axis 102 is shown in FIG. 1, it should be understood that the torque converter 100 can appear substantially similar below the central axis 102 with many components extending about the central axis 102. Words such as "axial," "radial," "circumferential," "outward," etc. as used herein are intended to be with respect to the central axis 102.

The torque converter 100 includes: a drive plate 104 arranged to receive torque; a front cover 106; an impeller 108; a turbine 110; a lock-up clutch 112; and a damper assembly 114. The impeller 108 includes: an impeller shell 116 non-rotatably connected to the front cover 106 such that the impeller 108 rotates as the front cover 106 rotates, at least one impeller blade 118 attached to an inner surface of the impeller shell 116, and an impeller hub 120 attached to a radially inner end of the impeller shell 116. The turbine 110 includes a turbine shell 122 and at least one turbine blade 126 attached to the turbine shell 122. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The drive plate 104 is connected to a crankshaft of a vehicle engine (not shown) via a projection. In an example embodiment, the projection is a stud 128. The stud 128 is non-rotatably connected to the drive plate 104, e.g., via a press-fit connection. That is, the stud 128 transfers torque from the vehicle engine to the drive plate 104. Connecting the stud 128 to the drive plate 104 eliminates a connector, e.g., welds, fasteners, etc., between the stud 128 and the front cover 106, which allows the lock-up clutch 112 to engage the front cover 106, as shown in the single FIGURE. In alternative embodiments, the projection can be a lug or any other suitable type of projection.

The front cover 106 is disposed axially between the drive plate 104 and the impeller 108. The front cover 106 is non-rotatably connected to the drive plate 104, e.g., via welds 130. That is, the drive plate 104 is configured to transfer torque to the front cover 106. The welds 130 may be radially spaced from each other.

The front cover 106 includes an inner axial portion 132 radially spaced from the central axis 102 and an outer axial portion 134 arranged radially outside of the inner axial portion 132. The front cover 106 includes a radial portion 136 extending radially from the inner axial portion 132 to the outer axial portion 134. The front cover 106 further includes a lower radial portion 138 extending radially inward from the inner axial portion 132, and an upper radial portion 140 extending radially outward from the outer axial portion 134.

The front cover 106 includes an opening 142 extending therethrough. The opening 142 is arranged radially inside of the outer axial portion 134. For example, the opening 142 may extend through the radial portion 136. In such an example, the opening 142 may be arranged closer to the inner axial portion 132 than to the outer axial portion 134. The opening 142 is arranged radially inside of the welds 130. The welds 130 may, for example, be positioned radially between the opening 142 and the outer axial portion 134.

The torque converter 100 may include a stator 144 disposed axially between the impeller 108 and the turbine 110 to redirect fluid flowing from the turbine blade 126 before the fluid reaches the impeller 108 to increase an efficiency of the torque converter 100. For example, the impeller blade 118, when rotated about the central axis 102, pushes the fluid outwardly. The fluid pushes against the turbine 110 of the torque converter 100, causing the turbine 110 to revolve about the central axis 102. The stator 144 functions to return the fluid from the turbine 110 back to the impeller 108 with minimal or no power loss. Drive power is transmitted from the turbine 110 to a transmission input shaft 124. The torque converter 100 may, for example, further include: a one-way clutch 146 disposed within the stator 144, a thrust bearing 148 disposed axially between the stator 144 and the impeller shell 116, a side plate 150 configured to retain the one-way clutch 146 within the stator 144, and a thrust washer 152 provided axially between a radially extending inner portion of the turbine shell 122 and the side plate 150.

The damper assembly 114 is configured to hydraulically transfer torque through the torque converter 100. The damper assembly 114 is positioned axially between the front cover 106 and the turbine 110. The damper assembly 114 may be configured to transfer torque from the front cover 106 to the transmission input shaft 124. The damper assembly 114 may include: outer springs 154 drivingly engaged with the lock-up clutch 112; inner springs 156 disposed radially inward of the outer springs 154; cover plates 158, 160; an output flange 162; and a centrifugal pendulum absorber 164.

The cover plate 158 may act as a retainer for the outer springs 154 and may support the inner springs 156 on one axial side. The cover plate 160 may support the inner springs 156 on another, opposite axial side. The cover plate 160 may further be connected to the turbine shell 122, for example, by a rivet. The centrifugal pendulum absorber 164 may, for example, by supported on the cover plate 160, e.g., arranged at a radial outer end thereof. As another example, the centrifugal pendulum absorber 164 may by supported on the output flange 162, e.g., arranged at a radial outer end thereof.

The output flange 162 is arranged between the cover plates 158, 160. The cover plates 158, 160 may be connected to each other and the output flange 162, e.g., via a fastener such as a rivet or the like, radially outside of the inner springs 156. The output flange 162 is connected to the transmission input shaft 124 for torque transmission therebetween.

Power from the vehicle engine can be transmitted to a transmission (not shown) via fluid, and via the torque converter 100. In particular, the power may first be transmitted to the drive plate 104 of the torque converter 100, which may transmit the power to the front cover 106. The lock-up clutch 112 is configured to selectively transfer torque from the front cover 106 to the transmission input shaft 124. The lock-up clutch 112 includes a piston 166, a clutch plate 168, and seal plate 170.

The clutch plate 168 is disposed between the front cover 106, e.g., the upper radial portion 140, and the piston 166. The clutch plate 168 may be configured to engage the outer springs 154. That is, the clutch plate 168 may transfer torque from the front cover 106 to the damper assembly 114.

The piston 166 is sealed at an inner diameter thereof to the inner axial portion 132 of the front cover 106 via a seal 172. Additionally, the piston 166 is sealed to the outer axial portion 134 of the front cover 106 via a seal 174. The piston 166 may further be connected to the seal plate 170 via a leaf-spring connection that allows axial displacement of the piston 166 in first axial direction AD1 and second axial direction AD2 for selective engagement of lock-up clutch 112.

The seal plate 170 is sealed to the transmission input shaft 124 at an inner end thereof, for example, via a bushing. The seal plate 170 is fixed to the front cover 106, e.g., via welds. The seal plate 170 may be fixed to the lower radial portion 138 of the front cover 106. The seal plate 170 is sealed at an outer diameter thereof to the piston 166 via a seal 176.

The torque converter 100 includes a piston apply chamber 178 and a compensation chamber 182. The piston apply chamber 178 is defined by, or bounded between, the inner axial portion 132, the seal 172, the piston 166, the seal 176, and the seal plate 170. The piston 166 engages or closes the lock-up clutch 112 in response to the pressurization of a medium (e.g., fluid such as oil) in the piston apply chamber 178, e.g., by axially displacing the piston 166 towards the radial portion 136 of the front cover 106. During axial movement of the piston 166, the piston 166 slides along the inner axial portion 132 of the front cover 106. The seals 172, 176 maintain a fluid separation between piston apply chamber 178 and the compensation chamber 182. By "bounded in part," we mean that a portion of the cited chamber, flow path, or other structure is bounded, or formed, by the cited element.

The torque converter 100 includes grooves 180 arranged on at least one of the lower radial portion 138 of the front cover 106 or the seal plate 170. The grooves 180 may extend radially into the piston apply chamber 178. The grooves 180 are provided to allow fluid flow between piston apply chamber 178 and the transmission input shaft 124. That is, pressurized fluid may be supplied from the transmission input shaft 124 and then routed between the front cover 106 and the seal plate 170 via grooves 180 to piston apply chamber 178.

The compensation chamber 182 is defined by, or bounded between, the front cover 106, the seal 172, the piston 166, and the seal 174. The opening 142 is provided to allow fluid flow between the compensation chamber 182 and the transmission input shaft 124. That is, fluid may be discharged the compensation chamber 182 via the opening 142 and then routed between the front cover 106 and the drive plate 104 to the transmission input shaft 124.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Drive plate
106 Front cover
108 Impeller
110 Turbine
112 Lock-up clutch
114 Damper assembly
116 Impeller shell
118 Impeller blade
120 Impeller hub
122 Turbine shell
124 Transmission input shaft
126 Turbine blade
128 Stud
130 Weld
132 Inner axial portion
134 Outer axial portion
136 Radial portion
138 Lower radial portion
140 Upper radial portion
142 Opening
144 Stator
146 One-way clutch
148 Thrust bearing
150 Side plate
152 Thrust washer
154 Outer springs
156 Inner springs
158 Cover plate
160 Cover plate
162 Output flange
164 Centrifugal pendulum absorber
166 Piston
168 Clutch plate
170 Seal plate
172 Seal
174 Seal
176 Seal
178 Piston apply chamber
180 Grooves
182 Compensation chamber
AD1 First axial direction
AD2 Second axial direction

What is claimed is:

1. A torque converter, comprising:
   a drive plate arranged to receive a torque;
   a front cover non-rotatably connected to the drive plate, the front cover having an inner axial portion and an outer axial portion arranged radially outside of the outer axial portion; and
   a lock-up clutch including a piston, the piston being sealed to the inner axial portion and to the outer axial portion of the front cover;
   wherein the piston and the front cover, at least partially, define a compensation chamber therebetween, the front cover including an opening extending through the front cover into the compensation chamber;
   wherein the front cover includes a radial portion extending from the inner axial portion to the outer axial portion, the opening extending through the radial portion.

2. The torque converter of claim 1, wherein the compensation chamber is in fluid communication with a transmission input shaft via the opening.

3. The torque converter of claim 1, wherein the front cover is non-rotatably connected to the drive plate radially outside of the opening.

4. The torque converter of claim 1, wherein the opening is arranged closer to the inner axial portion than to the outer axial portion.

5. The torque converter of claim 1, further comprising a projection configured to receive the torque and supported by the drive plate, wherein the projection is arranged radially outside of the outer axial portion of the front cover.

6. The torque converter of claim 5, wherein the front cover is non-rotatably connected to the drive plate radially inside of the projection.

7. The torque converter of claim 1, further comprising a seal plate non-rotatably connected to the front cover radially inside of the piston and sealed to the piston at an outer diameter of the seal plate.

8. The torque converter of claim 7, further comprising grooves between the front cover and the seal plate, wherein the seal plate and the piston, at least partially, define an apply chamber therebetween, the grooves extending radially into the apply chamber.

9. The torque converter of claim 1, wherein the front cover is non-rotatably connected to the drive plate radially between the inner and outer axial portions.

10. A torque converter, comprising:
    a drive plate arranged to receive a torque;
    a front cover non-rotatably connected to the drive plate, the front cover having an inner axial portion and an outer axial portion arranged radially outside of the outer axial portion;
    a lock-up clutch including a piston, the piston being sealed to the inner axial portion and to the outer axial portion of the front cover;
    a seal plate non-rotatably connected to the front cover radially inside of the piston and sealed to the piston at an outer diameter of the seal plate;
    and further comprising grooves between the front cover and the seal plate, wherein the seal plate and the piston, at least partially, define an apply chamber therebetween, the grooves extending radially into the apply chamber.

11. The torque converter of claim 10, wherein the piston and the front cover, at least partially, define a compensation chamber therebetween, the front cover including an opening extending through the front cover into the compensation chamber.

12. The torque converter of claim 11, wherein the compensation chamber is in fluid communication with a transmission input shaft via the opening.

13. The torque converter of claim 11, wherein the front cover is non-rotatably connected to the drive plate radially outside of the opening.

14. The torque converter of claim 11, wherein the front cover includes a radial portion extending from the inner axial portion to the outer axial portion, the opening extending through the radial portion.

15. The torque converter of claim 14, wherein the opening is arranged closer to the inner axial portion than to the outer axial portion.

16. The torque converter of claim 10, further comprising a projection configured to receive the torque and supported by the drive plate, wherein the projection is arranged radially outside of the outer axial portion of the front cover.

17. The torque converter of claim 16, wherein the front cover is non-rotatably connected to the drive plate radially inside of the projection.

18. The torque converter of claim 10, wherein the front cover is non-rotatably connected to the drive plate radially between the inner and outer axial portions.

* * * * *